United States Patent

Wolfe et al.

[15] 3,685,729

[45] Aug. 22, 1972

[54] FUEL CONTROL SYSTEM AND VALVE CONSTUCTION THEREFOR OR THE LIKE

[72] Inventors: Denis G. Wolfe, Greensburg; Gerald H. Eicher, Alverton, both of Pa.

[73] Assignee: Robertshaw Controls Company, Richmond, Va.

[22] Filed: Nov. 20, 1970

[21] Appl. No.: 91,438

[52] U.S. Cl. ................. 236/15 A, 251/11, 236/68 R, 337/1
[51] Int. Cl. ......................... F03g 7/06, F16k 31/02
[58] Field of Search...251/11; 236/68 R, 15 A; 337/1

[56] References Cited

UNITED STATES PATENTS

| | | | |
|---|---|---|---|
| 2,211,301 | 8/1940 | Taylor | 251/11 |
| 3,275,285 | 9/1966 | Morris | 251/11 |
| 2,210,046 | 8/1940 | Schubring | 251/365 X |
| 2,171,895 | 9/1939 | Sardeson | 73/362.5 X |

*Primary Examiner*—Arnold Rosenthal
*Attorney*—Candor, Candor & Tassone

[57] ABSTRACT

A housing having an inlet and an outlet separated by a valve seat and a movable valve member for controlling the valve seat. The valve member has a plural leg bimetal member defining two legs joined together at adjacent ends thereof by a yoke portion, the valve member having a valve seating part secured to the free end of one of the legs and being engageable with the valve seat. The other of the legs has the free end thereof secured to the housing and carries a heating device for warping the other leg to cause the bimetal member to move the valve seating part thereof away from the valve seat. The one leg of the bimetal member is normally bent out of the plane of the other leg whereby the natural bias of the one leg engages the valve seating part against the valve seat to seal close the same when the heating device is not heating the other leg.

18 Claims, 8 Drawing Figures

INVENTORS
DENIS G. WOLFE
GERALD H. EICHER
BY
Cauda, Cauda & Tassone
THEIR ATTORNEYS

INVENTORS
DENIS G. WOLFE
GERALD H. EICHER

BY Caudin, Caudin & Tarome

THEIR ATTORNEYS

INVENTORS
DENIS G. WOLFE
GERALD H. EICHER

THEIR ATTORNEYS

FUEL CONTROL SYSTEM AND VALVE CONSTUCTION THEREFOR OR THE LIKE

This invention relates to an improved fuel control system as well as to an improved valve construction for such a fuel control system or the like.

In particular, it is well known that fuel control systems are provided wherein a source of fuel is adapted to be interconnected to a burner means by a valve construction only when the valve construction is electrically operated.

Accordingly, one feature of this invention is to provide an improved valve construction of the above type.

In particular, one embodiment of this invention provides a valve construction having a housing means provided with an inlet and an outlet separated by a valve seat. A movable valve member is carried by the housing means for controlling the valve seat, the value member comprising a plural leg bimetal member defining two legs joined together at adjacent ends thereof by a yoke portion. The valve member has a valve seating part that is secured to the free end of one of the legs and is engageable with the valve seat means. The other of the legs has the free end thereof secured to the housing means and carries an electrical heating device. The heating device is adapted to warp the other leg when heating the same to cause the bimetal member to move the valve seating part away from the valve seat means. The one leg of the plural leg bimetal member is normally bent out of the plane of the other leg thereof whereby the natural bias of the one leg engages the valve seating part against the valve seat means to sealingly close the same when the heating device is no longer heating the other leg to warp the same.

Accordingly, it is an object of this invention to provide an improved valve construction having one or more of the novel features set forth above or hereinafter shown or described.

Another object of this invention is to provide an improved fuel control system utilizing such a valve construction.

Other objects, uses and advantages of this invention are apparent from a reading of this description which proceeds with reference to the accompanying drawings forming a part thereof and wherein.

Figure 1:
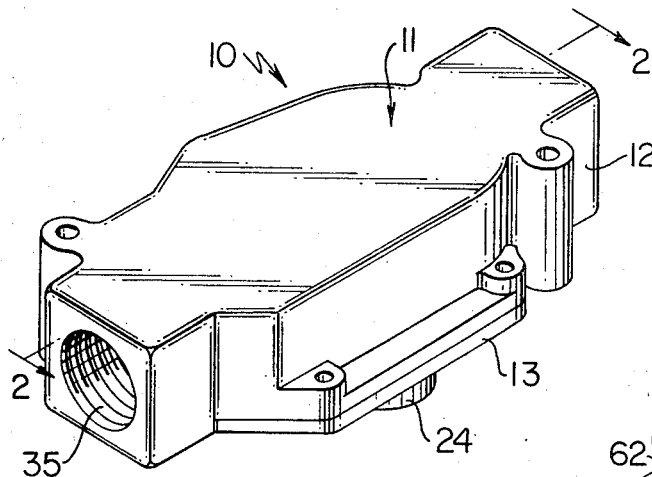
FIG. 1 is a top perspective view of the improved valve construction of this invention.

While the various features of this invention are hereinafter described and illustrated as being particularly adaptable for providing a valve construction for a fuel control system of a cooking apparatus or the like, it is to be understood that the various features of this invention can be utilized singly or in any combination thereof to provide a valve construction for other devices as desired.

Therefore, this invention is not to be limited to only the embodiment illustrated in the drawings, because the drawings are merely utilized to illustrate one of the wide variety of uses of this invention.

Figure 2:
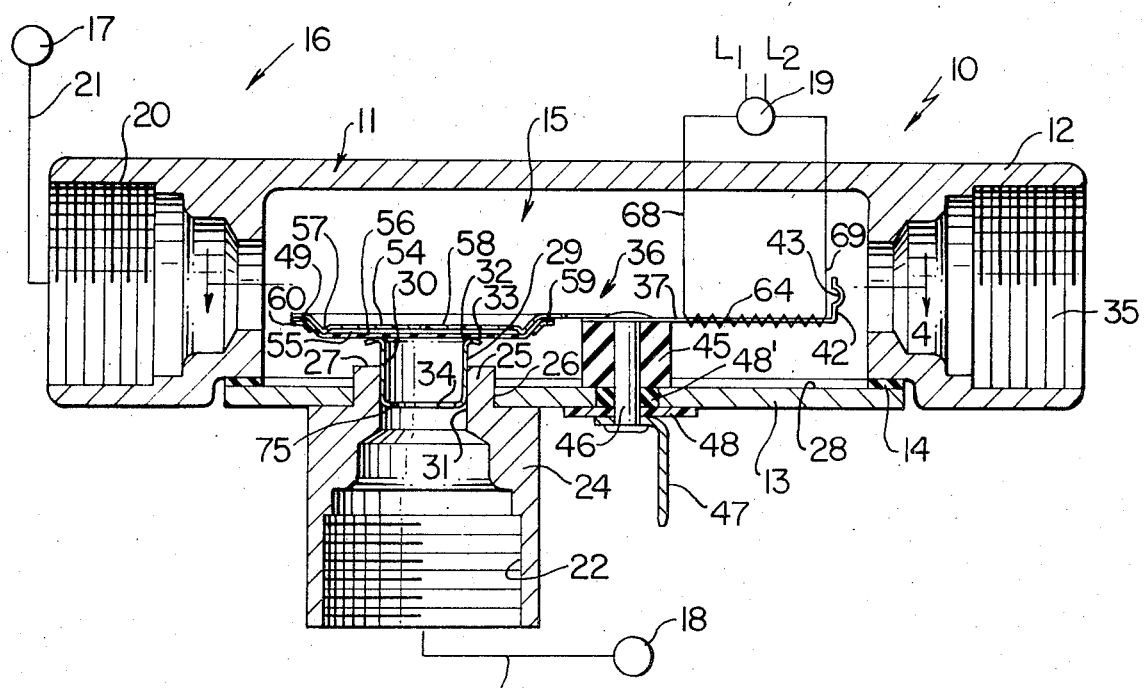
FIG. 2 is an enlarged cross-sectional view taken on line 2—2 of FIG. 1 with FIG. 2 schematically illustrating the improved fuel control system of this invention.

Referring now to FIGS. 1 and 2, the improved valve construction of this invention is generally indicated by the reference numeral 10 and comprises a housing means 11 formed of two housing parts 12 and 13 suitably secured together with gasket means 14 therebetween to seal around a chamber 15 defined between the housing members 11 and 13.

The valve construction 10 is utilized in a fuel control system of this invention that is generally indicated by the reference numeral 16 in FIG. 2 and comprises a fuel source 17, burner means 18 and a control device 19. The fuel source 17 is interconnected to an inlet 20 formed in the housing means 11 of the valve construction 10 by a conduit means 21 whereas an outlet 22 of the valve construction 10 is interconnected by a conduit means 23 to the burner means 18.

The outlet 22 of the housing means 11 is defined by a tubular part or fitting 24 carried by the plate-like housing member 13 and has a reduced cylindrical portion 25 thereof sealingly passing through an opening 26 in the plate 13 whereby the upper end 27 of the tubular member 27 projects above the upper surface 28 of the plate part 13. A cup-shaped member 29 has its cylindrical side wall means 30 press-fitted into the reduced part 31 of the outlet passage 22 that passes through the fitting 24 so that the upper open end 32 of the cup-like member 29 can extend above the end 27 of the fitting 24 to the desired distance, the upper end 32 of the cup-like member 29 being outwardly flanged at 33 and defining a valve seat separating the inlet 20 from the outlet 22. The cup-like member 29 has an opening 34 passing through the closed end 75 thereof so as to fluidly interconnect the upper end 32 thereof with the outlet 22.

Thus, it can be seen that by the press fit relation of the cup-shaped member 29 with the outlet fitting 24, the height of the valve seat 32 into the chamber 15 can be adjusted by merely forcing the cup-shaped member 29 to the desired position.

While the housing member 11 is illustrated as having another inlet or outlet 35 at the right hand end thereof similar to the inlet 20, it is to be understood that the inlet or outlet 35 can be utilized in the same manner as the inlet 20 or can be utilized as an outlet that leads to a desired location. Of course, the outlet 35 can be suitably plugged, if desired, whereby only one inlet 20 and one outlet 22 need be provided for the valve construction 10.

A valve member 36 is provided for the valve construction 10 and includes a plural leg bimetal member 37 having two legs 38 and 39 joined together at adjacent ends 40 and 41 thereof by a yoke portion 42 bent out of the plane of the legs 38 and 39 at a right angle thereto and being suitably stiffened or reinforced by rib means 43 formed therein. The legs 38 and 39 of the bimetallic member 37 are so constructed and arranged that with the high expansion side of the bimetal member 37 facing upwardly in the drawings, the leg 39 is bent out of the plane of the leg 38 in a downward direction in the drawings so that when the legs 38 and 39 are disposed in the coplanar relationship illustrated in FIG. 2, the natural bias of the leg 39 is in a downward direction to insure valve seating and sealing as will be apparent hereinafter.

The free end 44 of the leg 38 is adapted to be secured to an insulating post 45 disposed on the surface 28 of the housing part 13 and be not only fastened thereto by rivet-like means 46, but also be electrically interconnected by the rivet means 46 to an external terminal 47 also fastened to the housing part 13 by the rivet-like means 46 and being engaged against insulating members 48 and 48' whereby the terminal 47 is electrically interconnected to the leg 38 of the bimetal member 37.

Figure 3:
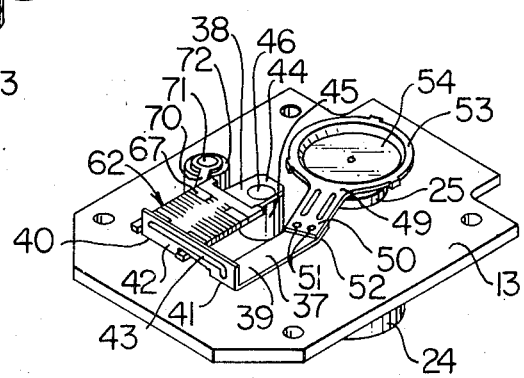
FIG. 3 is a top perspective view of part of the valve construction of FIG. 2.
Figure 5:
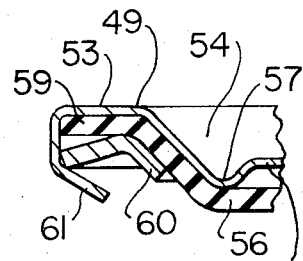
FIG. 5 is an enlarged, fragmentary, cross-sectional view taken on line 5—5 of FIG. 4.
Figure 8:
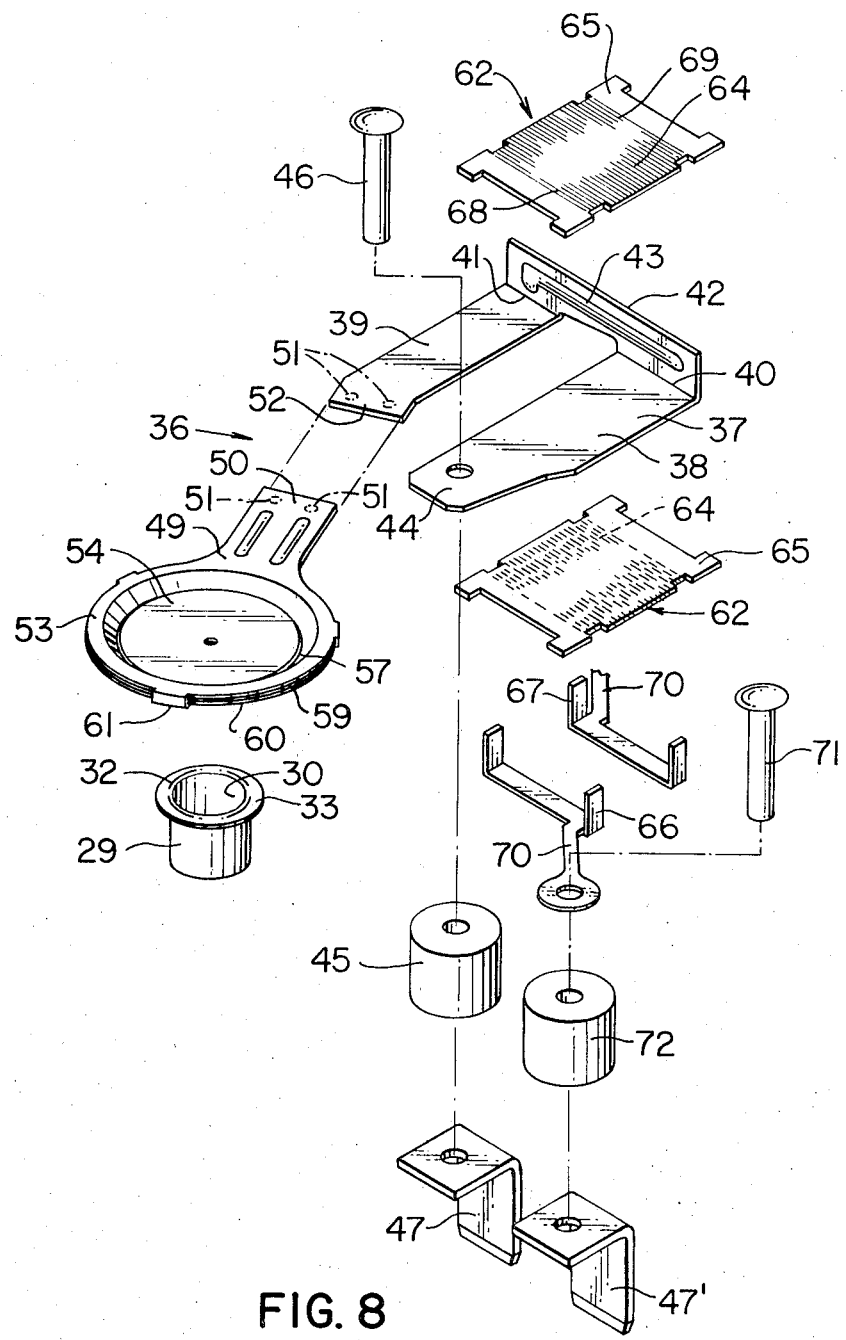
FIG. 8 is an exploded perspective view of the various parts of the valve member of the valve construction.

A valve seating part 49 is formed of non-bimetallic material and has an end 50 spot welded at 51 to the free end 52 of the leg 39 of the bimetal member 37, the valve part 49 being angularly disposed relative to the leg 39 of the bimetal member 37 toward the leg 38 while being coplanar with the leg 39 in order to render the valve member 36 relatively compact as will be apparent hereinafter. The valve part 49 includes a circular section 53 being dished on the side 54 thereof as illustrated in FIG. 3 and being opposite dished at 55 on the other side thereof. In this manner, a flexible membrane 56 is adapted to be carried on the dished side 55 of the valve part 49 so as to be stretched across an annular ridge means 57 thereof and normally be spaced from the circular central flat area 58 of the valve part 49, the membrane 56 having its outer periphery 59 held against the valve part 49 by an annular ring 60, FIG. 5, held in place by bent over tab means 61 of the circular part 53.

In this manner, the flexible membrane 56 is adapted to be compressed into sealing relationship against the open and flanged end 32, 33 of the valve seat member 29 when the bimetal member 37 is disposed in the position illustrated in FIG. 2 because the natural bias of the leg 39 is in a downward direction beyond the coplanar relationship illustrated in FIG. 2 so that positive sealing of the valve seat 32, 33 is provided since the flexible membrance 56 can be deformed toward the flat area 58 of the valve member part 49 without engaging against the same so as to positively seal completely around the flanged end 33 of the valve seat member 29.

A heating device 62 is carried on the leg 38 of the bimetal member 37 and comprises an electrical resistance wire 64 wound in coil fashion on suitable electrical insulating means or plates 65 between which the leg 38 of the bimetal member 37 is to be inserted. A pair of lead clamps 66 and 67 are respectively and electrically interconnected to the opposed ends 68 and 69 of the resistance wire 64 with the clamps 66 and 67 respectively having eyelet connectors 70 for interconnecting to desired terminal means.

For example, the end 68 of the resistance wire 64 is interconnected by its eyelet member 70 to a terminal rivet means 71 supported through an insulating post means 72 in the same manner that the post means 45 supports the free end 44 of the bimetal leg 38 whereby an external terminal 47' is directly interconnected to the end 68 of the resistance wire 64. The other end 69 of the resistance wire 64 is interconnected by its connecter clamp 67 to the bimetal leg 38 at the yoke portion 42 which, in turn, is electrically connected by the rivet 46 to the terminal 47 at the free end 44 of the leg 38 so that, in effect, the bimetal leg 38 is directly interconnected to the end 69 of the resistance wire 64. Thus, the resistance wire 64 of the heater 62 is placed across the terminals 47 and 47'.

Figure 6:
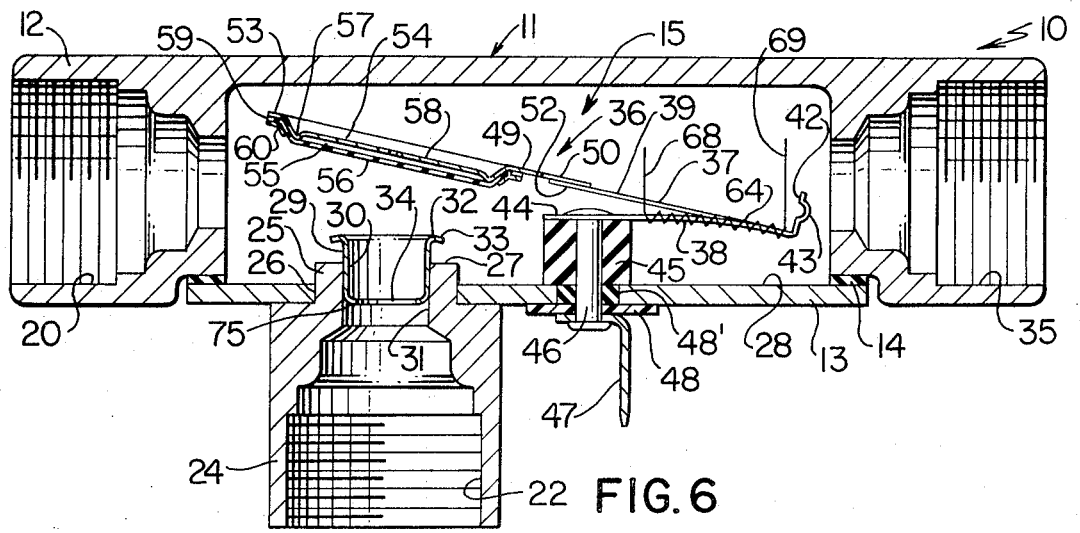
FIG. 6 is a view similar to FIG. 1 and illustrates the valve construction in its open position.

As illustrated schematically in FIG. 2, the ends 68 and 69 of the resistance wire 64 are respectively adapted to be interconnected by the terminals 47 and 47' to the control device 19 which is adapted to interconnect the wire 64 across power source leads $L_1$ and $L_2$ when the control device 19 senses that the output temperature effect of the burner means 18 is below a selected temperature effect. The interconnection of the resistance wire 64 to the power source leads $L_1$ to $L_2$ causes the resistance wire 64 to heat up and, thus, heat up the bimetal leg 38 in such a manner that the same warps as illustrated in FIG. 6 and through such warping and the stabilizing yoke portion 42 thereof cause the leg 39 to lift the valve part 49 away from the valve seat 29 so that the fuel source 17 will be adapted to be interconnected to the burner means 18 and thereby increase the temperature output of the burner means 18. Conversely, when the control device 19 senses that the output temperature effect of the burner means 18 is above the selected temperature effect, the control device 19 disconnects the power source leads $L_1$ and $L_2$ from the ends 68 and 69 of the resistance wire 64 so that the resistance wire 64 is no longer heating the bimetal legs 38. Thus, the leg 38 subsequently cools and warps back to its coplanar position illustrated in FIG. 2 to thereby carry the leg 39 downwardly and, through the natural resiliency of the prebent leg 39 that tends to move the same further downwardly in FIG. 2, completely seal close the valve seat 29 to disconnect the fuel source 17 from the burner means 18.

Figure 7:
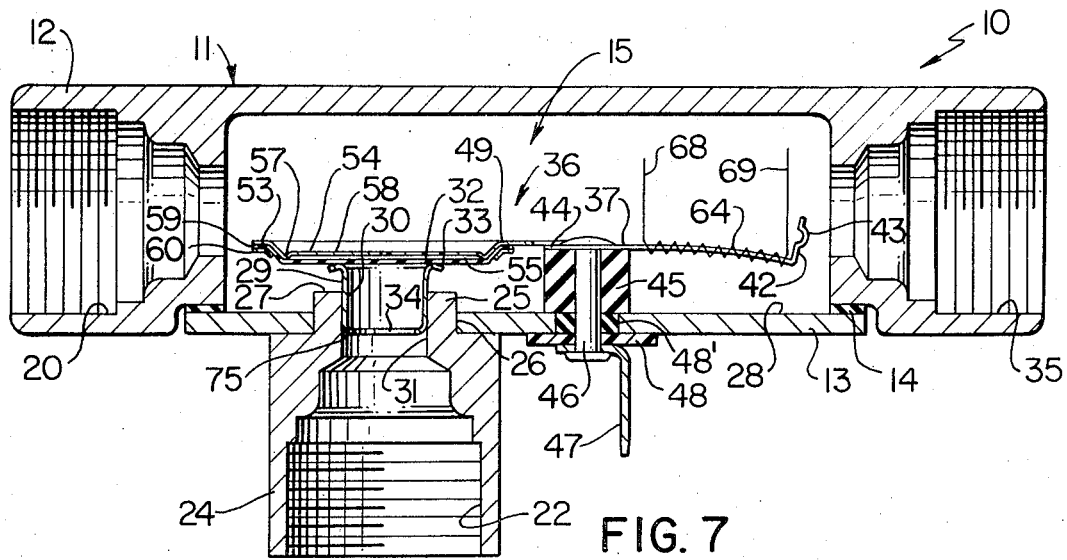
FIG. 7 is a view similar to FIG. 2 and illustrates the valve construction in its closed position and upon a rise in ambient temperature.
Figure 4:
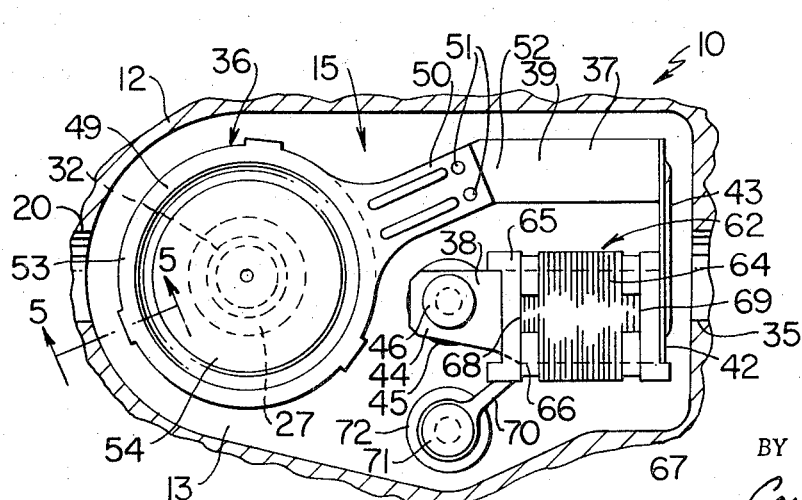
FIG. 4 is a fragmentary, cross-sectional view taken on line 4—4 of FIG. 2.

Should the ambient temperature surrounding the valve construction 10 increase even through the control device 19 is not attempting to operate the heating device 62, no false opening of the valve seat 29 will take place because both legs 38 and 39 of the bimetal member 37 will be warped downwardly in the manner illustrated in FIG. 7 in unison through the stabilizing effect of the yoke portion 42 of the bimetal member 37 whereby the valve member 36 remains in its sealed closed position against the valve seat member 29 even though the ambient temperature has increased over that normally encountered by the bimetal member 37.

Thus, it can be seen that this invention not only provides an improved valve construction having many novel, useful and unobvious features as previously set forth, but also this invention provides an improved fuel control system utilizing such valve construction.

While the form of the invention now preferred has been described as required by the patent statute, other forms may be utilized all coming within, the scope of the appended claims.

What is claimed is:

1. A valve construction comprising a housing means having an inlet and an outlet separated by a valve seat means of said housing means, and a movable valve member carried by said housing means for controlling said valve seat, said valve member having a plural leg bimetal member defining two legs joined together at adjacent ends by a yoke portion whereby said bimetal member is substantially U-shaped as defined by said two legs and said yoke portion thereof, said valve member having a valve seating part secured to the free end of one of said legs and being engageable with said valve seat means, the other of said legs having the free end thereof secured to said housing means, and a heating device carried by said other leg for warping said other leg when heating the same to cause the bimetal member to move said valve seating part away from said valve seat means, said one leg being normally bent out of the plane of said other leg whereby the natural bias of said one leg engages said valve seating part against said valve seat means to close the same when said heating device is not heating said other leg, said other leg of said bimetal member being wider than said one leg thereof.

2. A valve construction as set forth in claim 1 wherein said yoke portion of said bimetal member is disposed at an angle to said adjacent ends of said legs of said bimetal member.

3. A valve construction as set forth in claim 2 wherein said yoke portion has reinforcing rib means to stiffen the same.

4. A valve construction as set forth in claim 1 wherein said heating device comprises an electrical resistance wire means carried by said other leg.

5. A valve construction as set forth in claim 4 wherein said housing means carries a pair of terminal means operatively interconnected to opposed ends of said wire means, one of said terminal means being interconnected to its associated end of said wire means adjacent said free end of said other leg of said bimetal member.

6. A valve construction as set forth in claim 1 wherein said valve seating part of said valve member comprises a flexible membrane for sealing against said valve seat means.

7. A valve construction as set forth in claim 1 wherein said valve seating part of said valve member is disposed at an angle to said one leg of said bimetal member while being substantially coplanar therewith.

8. A valve construction as set forth in claim 7 wherein said valve seating part of said valve member is angled in a direction toward said other leg of said bimetal member.

9. A valve construction as set forth in claim 1 wherein said valve seat means of said housing means comprises a cup-like member press fitted in said outlet with the open end of said cup-like member being engageable by said valve member.

10. In a fuel control system having a source of fuel, a control device and burner means, the improvement comprising a valve construction having a housing means provided with an inlet and an outlet separated by a valve seat means of said housing means, means interconnecting said inlet to said fuel source and said outlet to said burner means, and a movable valve member carried by said housing means for controlling said valve seat, said valve member having a plural leg bimetal member defining two legs joined together at adjacent ends by a yoke portion whereby said bimetal member is substantially U-shaped as defined by said two legs and said yoke portion thereof, said valve member having a valve seating part secured to the free end of one of said legs and being engageable with said valve seat means, the other of said legs having the free end thereof secured to said housing means, and a heating device carried by said other leg for warping said other leg when heating the same to cause the bimetal member to move said valve seating part away from said valve seat means, said one leg being normally bent out of the plane of said other leg whereby the natural bias of said one leg engages said valve seating part against said valve seat means to close the same when said heating device is not heating said other leg, said other leg of said bimetal member being wider than said one leg thereof, said heating device being operatively associated with said control device whereby said control device controls the operation of said heating device.

11. In a fuel control system as set forth in claim 10, said yoke portion of said bimetal member being disposed at an angle to said adjacent ends of said legs of said bimetal member.

12. In a fuel control system as set forth in claim 11, said yoke portion having reinforcing rib means to stiffen the same.

13. In a fuel control system as set forth in claim 10, said heating device comprising an electrical resistance wire means carried by said other leg.

14. In a fuel control system as set forth in claim 13, said housing means carrying a pair of terminal means operatively interconnected to opposed ends of said wire means, one of said terminal means being interconnected to its associated end of said wire means at said free end of said other leg of said bimetal member.

15. In a fuel control system as set forth in claim 10, said valve seating part of said valve member comprising a flexible membrane for sealing against said valve seat means.

16. In a fuel control system as set forth in claim 10, said valve seating part of said valve member being disposed at an angle to said one leg of said bimetal member while being substantially coplanar therewith.

17. In a fuel control system as set forth in claim 16, said valve seating part of said valve member being angled in a direction toward said other leg of said bimetal member.

18. In a fuel control system as set forth in claim 10, said valve seat means of said housing means comprising a cup-like member press-fitted in said outlet with the open end of said cup-like member being engageable by said valve member.

* * * * *